US007675456B2

(12) United States Patent
Karam et al.

(10) Patent No.: US 7,675,456 B2
(45) Date of Patent: Mar. 9, 2010

(54) TECHNIQUE FOR MITIGATING MULTIPATH IMPACTS ON AZIMUTH ACCURACY IN A MONOPULSE INTERROGATOR

(75) Inventors: Mostafa A. Karam, Moorpark, CA (US); Yair Alon, Thousand Oaks, CA (US); Kyle Bailey, Moorpark, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 77 days.

(21) Appl. No.: 11/871,059

(22) Filed: Oct. 11, 2007

(65) Prior Publication Data

US 2009/0096674 A1  Apr. 16, 2009

(51) Int. Cl.
*G01S 13/78* (2006.01)
(52) U.S. Cl. .................... 342/45; 342/149; 342/159
(58) Field of Classification Search ............... 342/45, 342/149
See application file for complete search history.

(56) References Cited

U.S. PATENT DOCUMENTS

| | | | | |
|---|---|---|---|---|
| 3,378,843 | A * | 4/1968 | Sherman | 342/80 |
| 4,005,421 | A * | 1/1977 | Dax | 342/148 |
| 4,031,364 | A * | 6/1977 | Wilmot | 702/181 |
| 4,449,127 | A * | 5/1984 | Sanchez | 342/80 |
| 5,270,718 | A * | 12/1993 | DiDomizio | 342/147 |
| 5,892,478 | A * | 4/1999 | Moss | 342/149 |
| 6,040,797 | A * | 3/2000 | Hofele | 342/159 |
| 6,772,100 | B2 * | 8/2004 | Lipp | 702/193 |
| 6,937,186 | B1 * | 8/2005 | Dybdal et al. | 342/173 |
| 6,963,727 | B2 * | 11/2005 | Shreve | 455/39 |
| 2002/0180631 | A1 * | 12/2002 | Alon | 342/37 |
| 2003/0174088 | A1 * | 9/2003 | Dizaji et al. | 342/93 |
| 2005/0228613 | A1 * | 10/2005 | Fullerton et al. | 702/150 |

OTHER PUBLICATIONS

Daeipour et al. "Bias Compensation and Tracking with Monopulse Radars in the Presence of Multipath". IEEE Transactions on Aerospace and Electronic Systems. vol.33, Issue 3. Jul. 1997. pp. 863-882.*
Papa et al. "Multipath Effects on an Azimuthal Monopulse System". IEEE Transactions on Aerospace and Electronic Systems. vol. AES-19, Issue 4. Jul. 1983. pp. 585-597.*
A.D. Seiger, "Monopulse-Radar Angle Measurement in Noise", IEEE Transaction on Aerospace and Electronic Systems, vol. 30, No. 3. pp. 950-957, Jul. 1994.
W.D. Blair et al., "Statistical Monopulse Parameters for Tracking Rayleigh Targets", IEEE Transaction on Aerospace and Electronic Systems, vol. 34, No. 2 pp. 597-611, Apr. 1998.

* cited by examiner

*Primary Examiner*—Thomas H Tarcza
*Assistant Examiner*—Matthew M Barker

(57) ABSTRACT

A method for mitigating multipath impacts on azimuth accuracy in a monopulse interrogator is accomplished by calculating samples of monopulse ratio for samples of antenna boresight angles based on data received from an interrogation of a target. Samples of traditional target azimuth from the samples of monopulse ratio are calculated. A mean of the samples of traditional target azimuth is calculated. An alternative target azimuth from the samples of monopulse ratio is calculated. Whether a multipath signal exists is determined from observing a standard deviation of the samples of traditional target azimuth, and using the mean of the traditional target azimuth if a multipath signal does not exist and using the alternative target azimuth if a multipath signal does exist.

25 Claims, 11 Drawing Sheets

TECHNIQUE FOR MITIGATING MULTIPATH IMPACTS ON AZIMUTH ACCURACY IN A MONOPULSE INTERROGATOR

BACKGROUND OF THE INVENTION

1. Field of the Invention

The present invention relates to a technique for mitigating multipath impacts on azimuth accuracy in a monopulse interrogator.

2. Description of Related Art

Identification Friend or Foe (IFF) monopulse interrogators are typically used to determine an azimuth bearing of a target such as an aircraft. The target azimuth bearing is determined by processing magnitudes of monopulse ratio measured by a horizontally rotated beam of two-channel monopulse antenna.

In the presence of multipath signals arising from target images on nearby reflectors, the IFF monopulse ratio becomes complex having a real part and an imaginary part. The real part of the complex monopulse ratio has been used to obtain an estimate for the target azimuth, hereinafter it is called the traditional target azimuth.

The standard deviation of traditional target azimuth has been used as a flag to indicate the presence of multipath signals. Processing either the magnitude or the real part of the complex monopulse ratio yields inaccurate values for the target azimuth which can lead to target trajectories experiencing a bias and wandering azimuth.

SUMMARY OF THE INVENTION

The present invention provides a method for mitigating multipath impacts on azimuth accuracy of a monopulse interrogator. Samples of monopulse ratio for samples of antenna boresight angle within an antenna scan are calculated from an interrogation of a target. Samples of traditional target azimuth are calculated from the samples of monopulse ratio. A mean of the samples of traditional target azimuth is calculated. An alternative target azimuth is calculated from the samples of monopulse ratio within target's region which will be defined later. Whether a multipath signal exists is determined from a standard deviation of the samples of traditional target azimuth. The mean of the samples of traditional target azimuth is supplied as an output if a multipath signal does not exist. The alternative target azimuth is supplied as an output if the multipath signal does exist.

It is contemplated that the present invention could also be embodied in a payload of monopulse radar to mitigate impacts of multipath signals.

BRIEF DESCRIPTION OF THE DRAWINGS

The exact nature of this invention, as well as the objects and advantages thereof, will become readily apparent from consideration of the following specification in conjunction with the accompanying drawings in which like reference numerals designate like parts throughout the figures thereof and wherein.

DETAILED DESCRIPTION OF THE PREFERRED EMBODIMENTS

Figure 1:
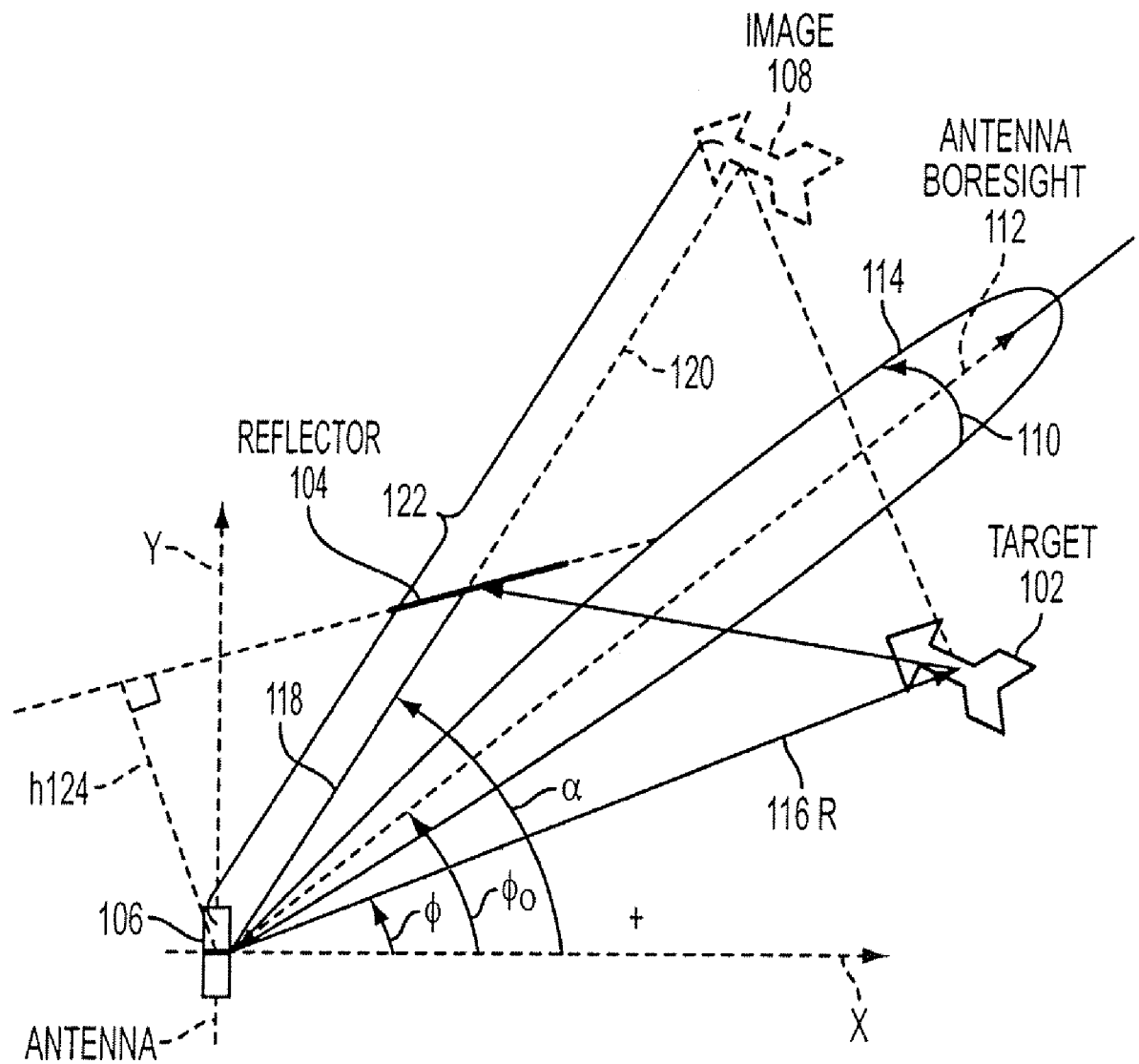
FIG. 1 is a graphical illustration of the problems encountered with multipath signals.

FIG. 1 illustrates the problems created by multipath signals. Antenna 106 interrogates a target 102 through the scan of antenna boresight 112. Antenna boresight 112 can have an antenna beam 114. Antenna boresight 112 rotates in an azimuth direction 110 and at angle $\phi_0$ from a reference horizontal axis. The reference horizontal axis is shown by the X-axis. Target 102, which antenna 106 interrogates by antenna boresight 112 is located at an angle $\phi$ from the reference horizontal axis and at a distance 116 from antenna 106.

Figure 2:
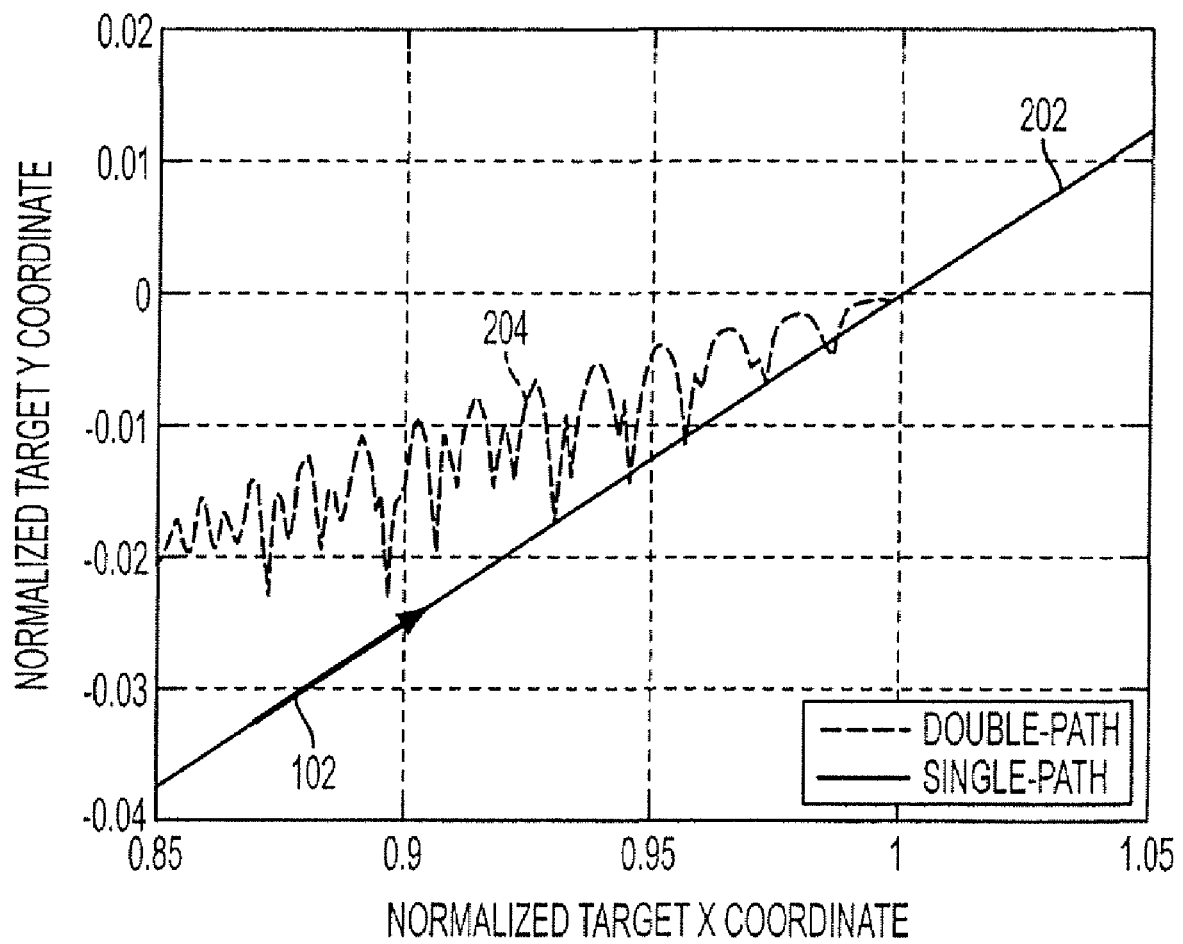
FIG. 2 is a graph depicting the problems encountered with multipath signals.

In FIG. 2, solid line 202 depicts the trajectory from a single path signal where there is only a target 102 and no reflector 104 to simulate an image 108. The dotted line 204 depicts a calculated trajectory from a double-path signal where there is a target 102 and a reflector 104, simulating the image 108. In both single path and double-path, target 102 is traveling at the exact same trajectory, yet the calculations using_traditional methods, shows two differing trajectories.

Figure 3:
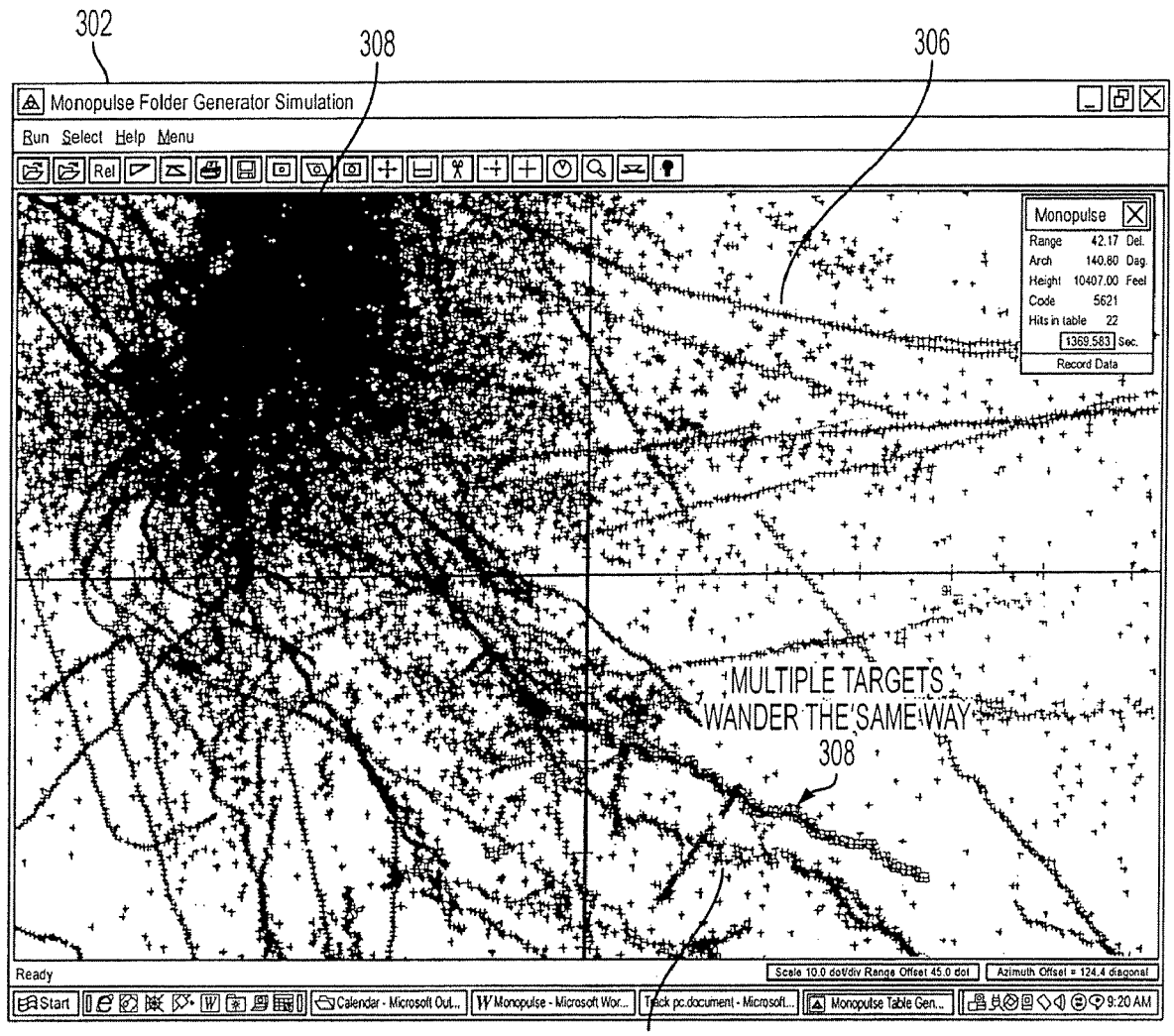
FIG. 3 is a plot display of wandering target trajectories observed by Northrop Grumman UPX-39 monopulse near LAX international airport.

FIG. 3 displays wandering target trajectories observed by UPX-39 monopulse around LAX international airport. Display 302 shows a plurality of trajectories 308 for a plurality of targets located near the airport. Trajectory 306 is substantially linear for a target where there is no reflective surface. However trajectories 304 and 308 are wandering, indicating the presence of a reflector near their respective targets with small separation from the target.

Figure 4:
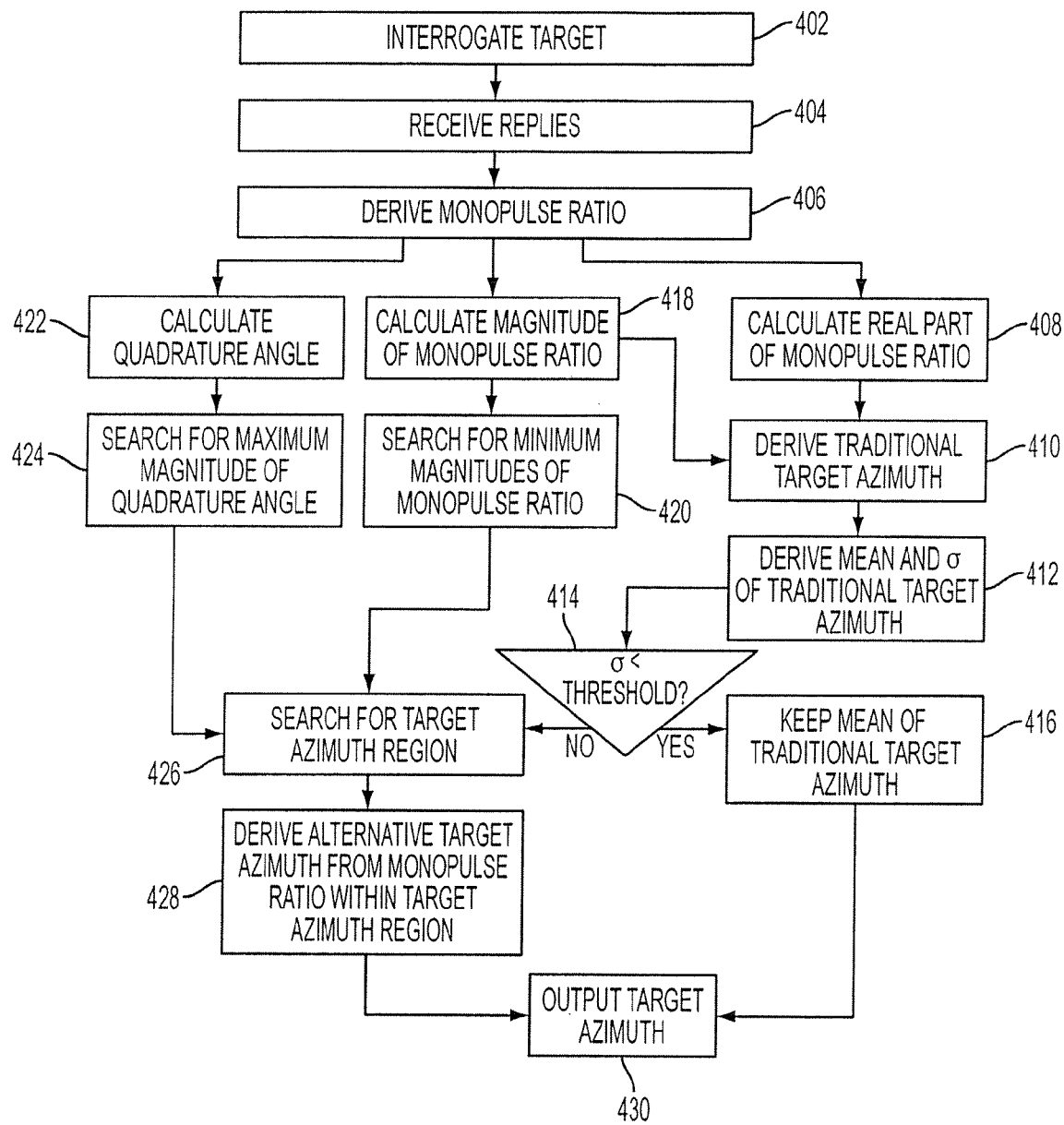
FIG. 4 is a flowchart for a method of detecting and mitigating multipath impacts on azimuth accuracy in a monopulse interrogator.

FIG. 4 is a flowchart depicting a preferred method of reducing the impact of multipath on azimuth accuracy in a monopulse interrogator. FIG. 4 depicts a variety of steps. It is understood that the steps could be performed in sequences other than shown.

In step 402, a target, such as target 102, is interrogated by a two-channel antenna 106. In step 404, the antenna receives replies from the interrogation of target 102. In step 406, a monopulse ratio is calculated. The monopulse ratio is $$\frac{D}{S} = \frac{V_1 - V_2}{V_1 + V_2} \quad (1)$$

$V_1$ is a voltage in one of the antenna channels and $V_2$ is a voltage in the other antenna channel.

In the presence of multipath signals, the monopulse ratio is complex and can be expressed as having a real part u an imaginary part v, and a phase $\Theta$. The imaginary part of the monopulse ratio is referred to as the quadrature angle, in steps 408, 418, and 422, the real part, the magnitude, and the quadrature angle, of the monopulse ratio are calculated.

The real part of the monopulse ratio can be expressed from S. M. Sherman; Complex indicated angles applied to unresolved radar targets and multipath, IEEE Transaction on Aerospace and Electronic Systems, Vol. AES-7, No. 1, 1971 as $$u = \text{Re}\left(\kappa_\phi \frac{D}{S}\right) = -\phi_0 + \frac{\phi + (\phi + \alpha)\chi\cos\psi + \alpha\chi^2}{1 + \chi^2 + 2\chi\cos\psi}. \quad (2)$$

Where $\phi_0$ is the antenna boresight angle; $\kappa_\phi$ is the antenna slope which equated to unity for simplicity; and $\chi$ and $\psi$ are amplitude and phase of the ratio between the target field and image field at the antenna 106.

The quadrature angle of the monopulse ratio is expressed from S. M. Sherman; Complex indicated angles applied to unresolved radar targets and multipath, IEEE Transaction on Aerospace and Electronic Systems, Vol. AES-7, No. 1, 1971 as $$v = \text{Im}\left(\kappa_\phi \frac{D}{S}\right) = -\frac{(\phi - \alpha)\chi\sin\psi}{1 + \chi^2 + 2\chi\cos\psi}. \quad (3)$$

The quadrature angle is calculated in step 422.

The phase of the monopulse ratio (1) can be expressed as $$\Theta = \arctan\frac{v}{u} \quad (4)$$

The phase is calculated in step 408 along with the real part of the monopulse ratio.

The magnitude of the monopulse ratio is expressed as $$\left|\frac{D}{S}\right| = \left|\frac{V_1 - V_2}{V_1 + V_2}\right| \quad (5)$$

and it is calculated in step 418.

The magnitude of the ratio between the image field and the target field is expressed as $$\chi = \frac{G(\alpha - \phi_0)}{G(\phi - \phi_0)}\Gamma \quad (6)$$

$\Gamma$ is the magnitude of reflection coefficient at the surface of reflector 104, $G(\alpha-\phi_0)$ is the antenna radiation pattern along the image azimuth $\alpha$, and $G(\phi-\phi_0)$ is the antenna radiation pattern along the target azimuth $\phi$.

In the case of either a conducting reflector or a grazing incidence, where $\Gamma=1$, and an antenna with a Gaussian radiation pattern, the magnitude of the ratio between the image field and the target field at the antenna (6) can be expressed as $$\chi = \exp(-a\{\alpha - \phi_0\}^2 + a\{\phi - \phi_0\}^2), \quad (7)$$

where $$a = 0.3466\left(\frac{1}{\theta_0}\right)^2 \quad (8)$$

In (8), $2\theta_0$ is the 3 dB antenna beam width. With some direct mathematical manipulations, the magnitude of the ratio between the image field and the target field at the antenna (7) can also be expressed as $$\chi = \exp(-2a\{\phi_m - \phi_0\}\{\alpha - \phi\}) \quad (9)$$

where $\phi_m$ is the arithmetic mean of the target azimuth and the image azimuth.

$$\phi_m = \frac{\alpha + \phi}{2} \quad (10)$$

The image azimuth can use the following identity:

$$\alpha = \beta + \arctan\left(\frac{2h}{R\cos(\phi - \beta)} - \tan(\phi - \beta)\right) \quad (11)$$

The distance h is shown as a distance 124 in FIG. 1 and is the distance between an antenna 106 and a reflector 104 measured in a direction perpendicular to the reflector 104. Distance h can be positive or negative depending on antenna location with respect to the reflector. Distance R is the distance 116 and is the distance between the antenna 106 and a target 102. In addition, $\beta$ is the inclination angle of the reflector on the X axis (not shown).

To exclude non physical values for the image azimuth, the image azimuth (11) should be subjected to the following conditions:

$$\text{sgn}(\alpha) = \text{sgn}(h)$$

$$|\alpha| > |\phi| \quad (12)$$

wherein sgn(x) is the sign function and stands for the polarity of the parameter x. The sign function can be expressed as:

$$\text{sgn}(x) = \begin{bmatrix} 1, & x > 0 \\ -1, & x < 0 \end{bmatrix} \quad (13)$$

In the special case of both an aircraft target flying in the antenna far field and azimuth angles ($\alpha$, $\phi$, $\phi_0$) measured from the reflector plane, $\alpha = -\phi$. Thus the real part (2) and imaginary part (3) of the monopulse ratio can be expressed as $$u = \text{Re}\left(\kappa_\phi \frac{D}{S}\right) = -\phi_0 + \phi \frac{1 - \chi^2}{1 + \chi^2 + 2\chi\cos\psi} \quad (14)$$

$$v = \text{Im}\left(\kappa_\phi \frac{D}{S}\right) = -\phi \frac{2\chi\sin\psi}{1 + \chi^2 + 2\chi\cos\psi} \quad (15)$$

These two equations are used in an embodiment of the present invention.

Calculation steps 408, 418, and 422 of FIG. 4 can be completed substantially in parallel. However, steps 408, 418, and 422, may also be completed serially, partially in parallel, or completely in parallel.

To derive a traditional target azimuth in step 410, the real part of monopulse ratio is used. The target azimuth $\phi_0$ is expressed as $$\phi = \phi_0 + \text{Re}\left(\kappa_\phi \frac{D}{S}\right) \quad (16)$$

In the case of a single path, the phase of monopulse ratio is either 0 or $\pm\pi$ and gives real values for target azimuth with a polarity depending on target location with respect to antenna boresight.

In step 412, the mean of the traditional target azimuth and the standard deviation $\sigma$ of the traditional target azimuth are calculated. Upon calculating values of the traditional target azimuth within an antenna scan, the mean and standard deviation $\sigma$ of those values are calculated and stored. To reduce processing time a moving window technique is used for calculating the mean and standard deviation of traditional target azimuth.

The moving window technique can be illustrated by consulting N samples within each antenna scan. For a window of n+1 samples (n+1$\leq$N), the first moment $<\phi>_{n+1}$ and second moment $<\phi^2>_{n+1}$ of target azimuth can be expressed as $$<\phi>_{n+1} = \frac{n<\phi>_n + \phi_{n+1}}{n+1} \quad (17)$$

$$<\phi^2>_{n+1} = \frac{n<\phi^2>_n + \phi_{n+1}^2}{n+1}$$

where $<>_n$ is the ensemble average over n samples.

The number of samples is increased until it encounters all the N samples within the antenna scan. In this case the first moment and the second moment can be used to obtain the mean $\bar{\phi}$ and the standard deviation $\sigma$ of the target azimuth using the following equations $$\bar{\phi} = <\phi>_N$$

$$\sigma = \sqrt{<\phi^2>_N - \bar{\phi}^2} \quad (18)$$

In step 414, the standard deviation is compared to a predetermined threshold value. If the standard deviation is greater than a predetermined threshold value, then multipath signals exist. If the standard deviation is not greater than a predetermined threshold value, then multipath signals do not exist.

The predetermined threshold value is dependent on noise level in the system. An explanation for deriving the predetermined threshold value can be found in W. D. Blair & M. Brandt-Pearce, *Statistical Description of Monopulse Parameters for Tracking Rayleigh Targets*, IEEE Transaction on Aerospace and Electronic Systems, Vol. 34, No. 2, 597 (1998); and A. D. Seifer, *Monopulse-Radar Angle Measurements in Noise*, IEEE Transaction on Aerospace and Electronic Systems, Vol. 30, No. 3, 950 (1994) which are hereby incorporated by reference.

In step 416, the mean of the target azimuth is stored. In step 430 the mean of the target azimuth is outputted.

In step 420, a search for the minimum of the magnitudes of the monopulse ratio is performed. To accomplish this, at an arbitrary antenna boresight angle $\phi_{0n}$ the difference $\Delta_n$ between magnitude of monopulse ratio $|D/S|_n$ and its counterpart $|D/S|_{n-1}$ measured at the preceding boresight angle $\phi_{0(n-1)}$ is calculated.

$$\Delta_n = |D/S|_n - |D/S|_{n-1} \quad (19)$$

If the difference $\Delta_n$ changes its polarity from − to + the preceding antenna boresight $\phi_{0(n-1)}$ can be considered the boresight at which a minimum of the magnitude of the monopulse ratio occurs. This procedure is repeated to find other minima for the monopulse ratio. The minima of the magnitude of the monopulse ratio and the corresponding boresight angles are used in step 426 to search for a target azimuth region, which will be described more fully in detail hereinafter.

Figure 5:
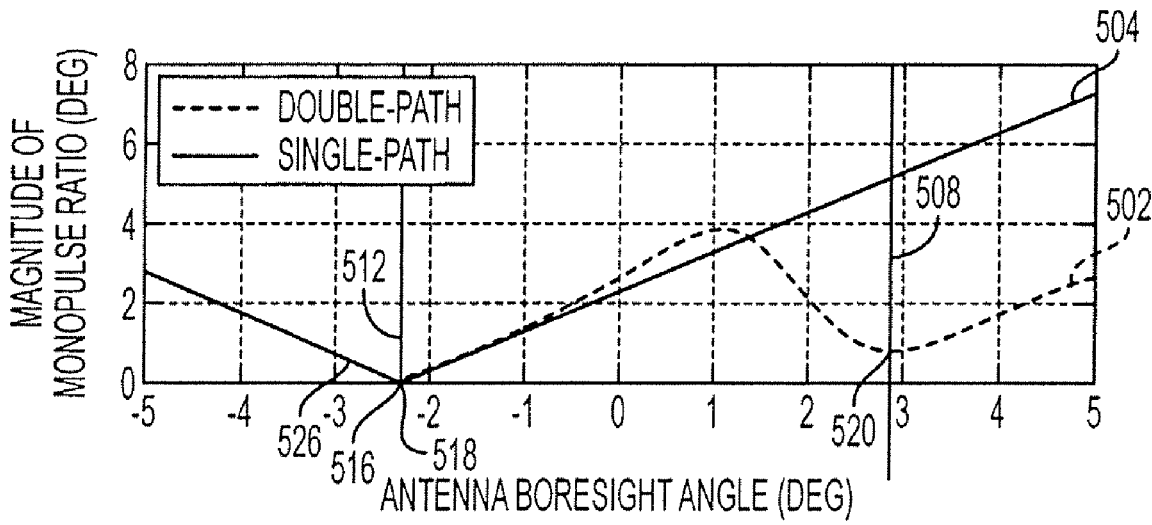
FIG. 5 is a graph of monopulse ratio.

In the case of a double path signal, where there is only one image, there may be one or two minima for the magnitude of the monopulse ratio. If there is only one minimum value, it may be associated with either the target or the image depending on the angular distance between the target and its image. If there are two minima, one of them is associated with the target and the other is associated with the image. The minimum value associated with the target is deeper than its counterpart associated with phantom image, as seen in FIG. 5.

Alternatively, the minimum of the magnitude of the monopulse ratio (5) can be calculated by first rewriting the monopulse ratio as:

$$D/S = |D/S|\exp(j\Theta) \quad (20)$$

The differential of the logarithm of the monopulse ratio can then be taken to get $$\frac{(D/S)'}{(D/S)} = \frac{|D/S|'}{|D/S|} + j\Theta' \quad (21)$$

The prime (') over any quantity stands for the first order derivate with respect to the antenna boresight angle $\phi_0$. The above identity provides a tool for getting the first order derivative of magnitude and phase monopulse ratio from the first order derivative of such a ratio.

In obtaining the first order derivative of the monopulse ratio and hence the first order derivatives of the ratio magnitude and phase, the monopulse ratio can be rewritten as $$D/S = u + jv \quad (22)$$

Then the differential of the logarithm of the rewritten monopulse ratio can be taken as follows $$\frac{(D/S)'}{(D/S)} = \frac{u' + jv'}{u + jv} \tag{23}$$

Multiplying the numerator and the denominator in the right hand side of (23) by u−jv yields $$\frac{(D/S)'}{(D/S)} = \frac{u'u + v'v}{u^2 + v^2} + j\frac{uv' - vu'}{u^2 + v^2} \tag{24}$$

which can then be compared to the equation (21) resulting in the first order derivative of the monopulse ratio $$|D/S|' = \frac{u'u + v'v}{u^2 + v^2}|D/S| \tag{25}$$

The first order derivative can then be equated to zero to find the relationship governing the antenna boresight angles of the minima or maxima of the monopulse ratio. In doing so, we get $$uu' + vv' = 0 \tag{26}$$

The differential u' can be found by differentiating (14) yielding:

$$u' = -1 - \frac{2\phi[2\chi + (1+\chi^2)\cos\psi]\chi'}{(1+\chi^2+2\chi\cos\psi)^2} \tag{27}$$

where $$\chi' = -4a(\phi_m - \phi)\chi \tag{28}$$

The differential v' can be found by differentiating (15) yielding:

$$v' = -\frac{2\phi\sin\psi(1-\chi^2)\chi'}{(1+\chi^2+2\chi\cos\psi)^2} \tag{29}$$

Introducing explicit expressions of u(14), v(15), u'(27), and v'(29) into (26) leads to a nonlinear equation for antenna boresight. Some special cases, however, need to be discussed with respect to solutions for the equation.

In the first special case, the target is separable from its image. In this case, the minimum of the magnitude of the monopulse ratio associated with the target occurs at very small values of χ where χ<<1. Thus, from (14) we get $$u \approx -\phi_{0m} + \phi$$

$$v \approx 0 \tag{30}$$

Introducing (30) into (26) results in $\phi_{0m} = \phi$ implying that the above boresight angle coincides with the target azimuth. This can also be inferred from FIG. 5.

Next, the minimum magnitude value associated with the image is found. Such a value occurs at large values for the field ratio χ where χ>>1. Accordingly from (14) we get, $$u \approx -\phi_{0m} - \phi \tag{31}$$

$$v \approx -\phi\frac{2\sin\psi}{\chi} \approx 0$$

Introducing (31) into (26) results in $\phi_{0m} = -\phi$ which coincides with the image azimuth, as seen in FIG. 5.

Figure 13:
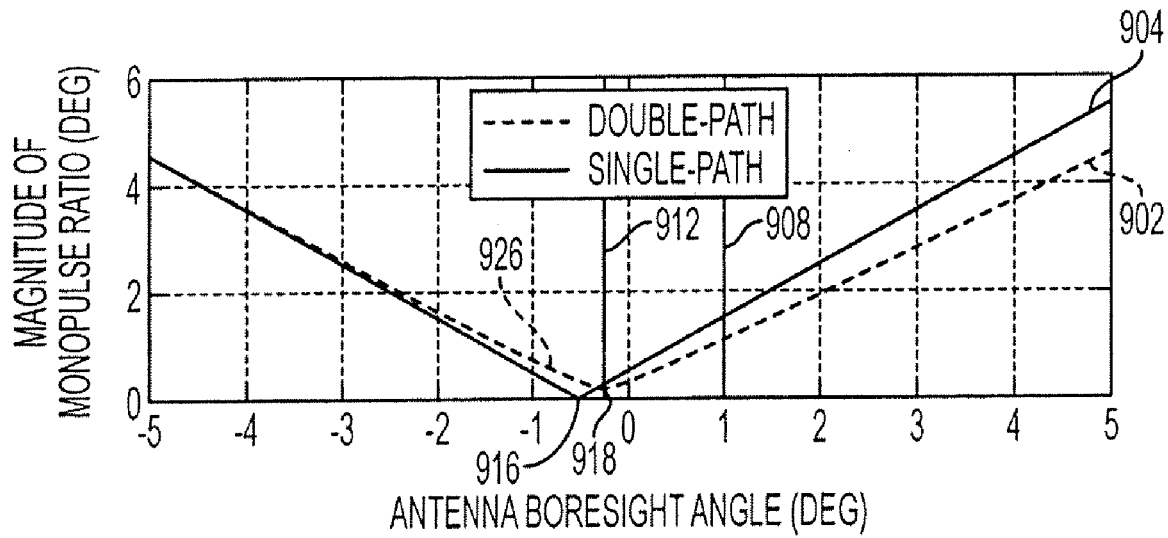
FIG. 13 is a graph of magnitude of monopulse ratio as a function of antenna boresight angle.

When the target and its image are within the antenna beam width no simple analytic solution is available. In this case numerical simulations could be used to search for the minimum of the magnitudes of the monopulse ratio as shown in FIGS. 13, 14, 15 and 16. FIG. 13 are calculated when the target and its image are not resolved. The two minima of the magnitude of the monopulse ratio may overlap each other, as in FIGS. 13, 14, or they may be separable but their azimuth locations are different from the corresponding actual locations as seen in FIG. 15.

In step 424, a search for the maximum of the magnitudes of quadrature angle is considered. To accomplish this, at an arbitrary antenna boresight angle $\phi_{0n}$ the difference $\Delta v_n$ between magnitude of quadrature angle $|v_n|$ and its counterpart $|v_{(n-1)}|$ measured at the preceding antenna boresight angle $\phi_{0(n-1)}$ is calculated $$\Delta v_n = |v_n| - |v_{(n-1)}| \tag{32}$$

If the difference $\Delta v_n$ changes its polarity from + to −, the antenna boresight angle $\phi_{0(n-1)}$ is considered as the antenna boresight angle where a maximum of the magnitude of the quadrature angle occurs. This procedure is repeated to find other maxima of the magnitude of the quadrature angle. The maximum of the magnitudes of the quadrature angles and the corresponding antenna boresight angles are then stored for use in step 426, which will be described more fully in detail later.

In the case of only one image such as in the case of a double-path signal, there is only one maximum for the quadrature angle. The maximum occurs at an azimuth located between the target azimuth and the image azimuth. If the quadrature angle has zero values within any antenna scan, the above step could be skipped.

If the phase ψ=mπ(m=0,1, . . . ) the quadrature angle described by either (4) or (15) reduces to zero. This justifies not using the quadrature angle as a flag for investigating the presence of multipath signals.

Alternatively, to obtain the antenna boresight angles at which the maximum of the magnitude of the quadrature angle occur, the first order derivative of the quadrature angle (15) is used:

$$v'_q = -2\phi\sin\psi\frac{(1-\chi^2)}{(1+\chi^2+2\chi\cos\psi)^2}\chi' \tag{33}$$

For non trivial location, where a maximum of the magnitude of the quadrature angles occur, χ=1, which can be substituted into the above formula. Solving the resultant gives the antenna boresight of the maximum of the magnitude of the quadrature angle which occurs at the arithmetic mean $\phi_{mq}$ described by (10).

This indicates that in the presence of double-path signals, there is only one boresight angle at which the magnitude of the quadrature angle is a maximum. Such a boresight angle is equal to the arithmetic mean of the target azimuth and the image azimuth. So it is located within the target-image azimuth region as seen in FIGS. 5, 6, 15 and 16. Accordingly, it can be used along with the minimum of the magnitude of the monopulse ratio for identifying the extent of the target-azimuth region and hence for mitigating impacts of multipath signals.

Figure 6:
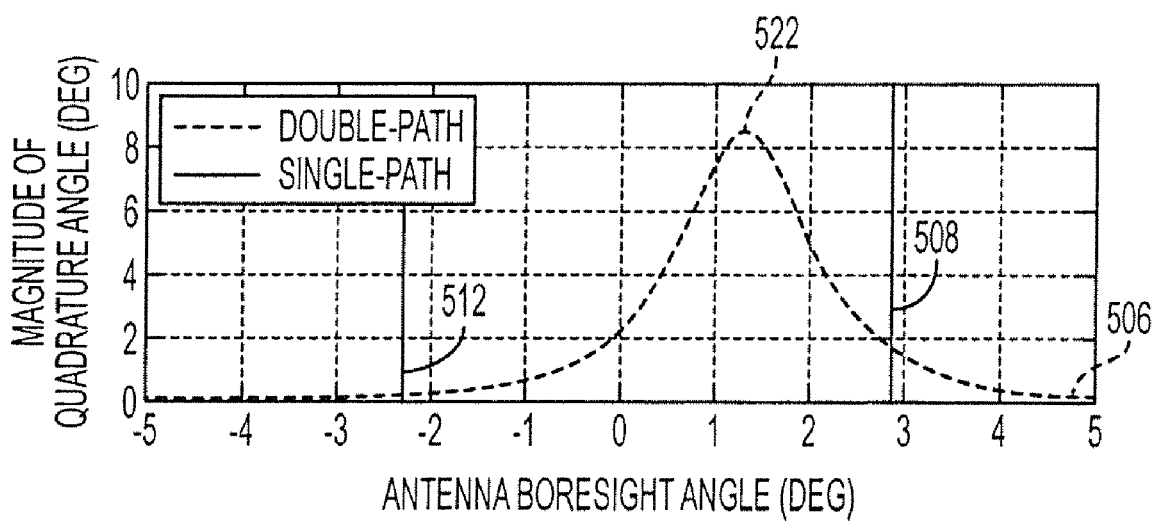
FIG. 6 is a graph of quadrature angle_for monopulse ratio as a function of antenna boresight angle.

In step 426, a search for a target azimuth region is conducted. In the presence of multipath signals, an angular zone scanned by a monopulse antenna can be divided into three azimuth regions: (1) target azimuth region; (2) image-target azimuth region; and (3) image azimuth region. The target azimuth region is less affected by multipath signals and is located near the minimum of the magnitude of the monopulse ratio associated with the target, as seen in FIGS. 5 and 6. It is away from the side where the maximum of the quadrature angle takes place. Thus, values of the monopulse ratio acquired with the target azimuth region will be used in deriving the target azimuth.

To search for the target azimuth region, antenna boresight angles of the minimum for the magnitude of the monopulse ratio are compared to each other and then compared to the corresponding boresight angles at which the maximum of the magnitude of the quadrature angle occurs. If there are two minima for the magnitude of the monopulse ratio, the region between the two minima is excluded as the target azimuth region, and the region near the deepest minimum which is not excluded is chosen as the target azimuth region. If there is only one deep minimum for the magnitude of the monopulse ratio and one maximum for the magnitude of the quadrature angle, the region between the minimum of the magnitude of the monopulse ratio and the maximum of the magnitude of the quadrature angle is excluded as the target azimuth region, and the region near the minimum of the magnitude of the monopulse ratio which is not excluded is chosen as the target azimuth region.

The alternative target azimuth is then calculated in step 428 from within the target azimuth region since the target azimuth region is less affected by the multipath signals. The slope of the magnitude of the monopulse ratio may be used to calculate the target azimuth by projecting where the target azimuth would be. If the difference between the target azimuth and image azimuth is larger than the antenna beam width, values of the monopulse ratio are similar to their counterparts in the absence of multipath signals. However, if the difference between the target azimuth and image azimuth is in the order of, or less than the beam width, the slope governing the linear relation between the magnitude of the monopulse ratio and antenna boresight angle may be slightly different from the corresponding slope, in absence of the multipath signals. Thus, the residual azimuth may still wander slightly after the impacts of the multipath signals are mitigated.

FIG. 5 is a graph depicting the magnitude of monopulse ratio. FIG. 6 is a graph depicting the magnitude of quadrature angle as a function of antenna boresight angle. In FIG. 5, line 502 represents the magnitude of the monopulse ratio for a double-path image. Line 504 represents the magnitude of the monopulse ratio for a single-path image. As can be seen in a single-path image, the target is located where the magnitude of the monopulse ratio is 0. In the double-path image, the target is located at point 516, and the image is located at point 520. Point 520 and point 518 are also minima of the magnitude of the monopulse ratio.

In both FIGS. 5 and 6, line 512 intersects both graphs at the target location 518 of the double-path image. Similarly, in both FIGS. 5 and 6, line 508 intersects both graphs at the image location 520 of the double-path image. In FIG. 6, line 506 represents the magnitude of the quadrature angle, while point 522 represents a maximum of the magnitude of the quadrature angles. Since there are two minima of the magnitude of the monopulse ratio for the double-path image and one maximum of the quadrature angle for the double-path image, the region of the boresight angle in area 524 between the two minima of the magnitude of the monopulse ratio for the double-path image is excluded when choosing the target azimuth region. The non-excluded region of the boresight angle in area 526 near the lowest minimum of the two minima of the magnitudes of the samples of quadrature angles is chosen as the target azimuth region.

In one embodiment, the region to the left of line 512 can be considered the target azimuth region, the area to the right of line 508 can be considered the image azimuth region, and the area between line 508 and line 512 can be considered the interference azimuth region or target-image azimuth region for both graphs 5 and 6.

Figure 7:
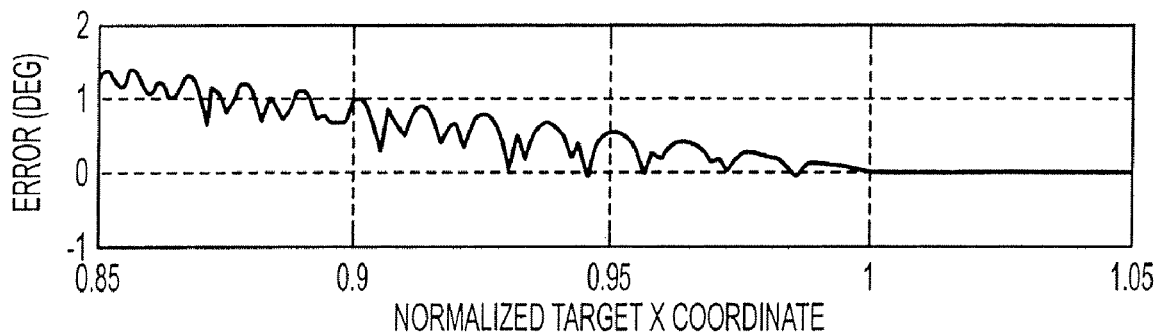
FIG. 7 is a graph of error as a function of target normalized X coordinate.
Figure 8:
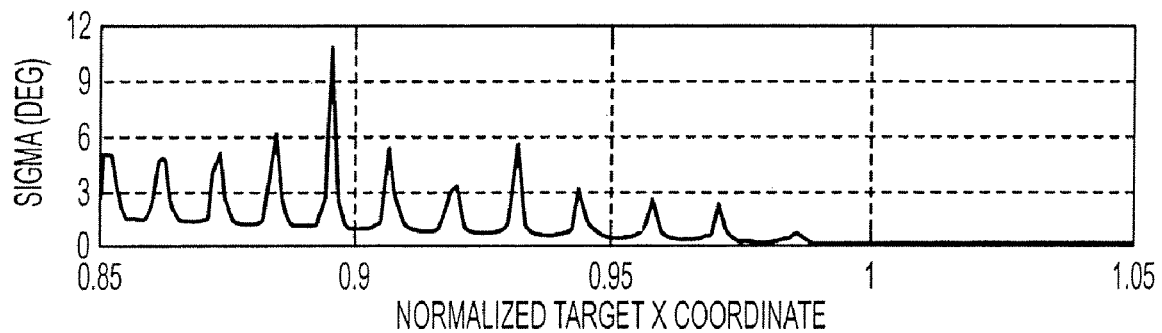
FIG. 8 is a graph of standard deviation of target azimuth as a function of target normalized X coordinate.
Figure 9:
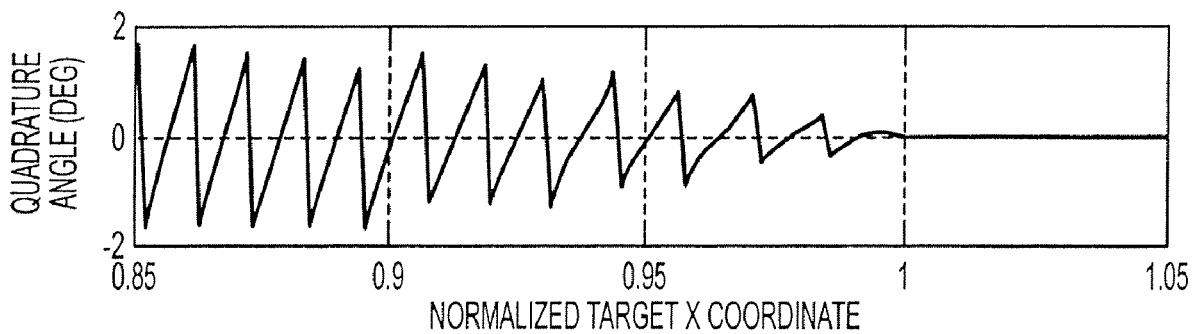
FIG. 9 is a graph of the quadrature angle as a function of target normalized X coordinate.

FIG. 7 is a graph depicting the error of traditional target azimuth as a function of target normalized X coordinate. FIG. 8 is a graph depicting the standard deviation of the traditional target azimuth as a function of target normalized X coordinate. FIG. 9 is a graph depicting the quadrature angle as a function of target normalized X coordinate.

Figure 10:
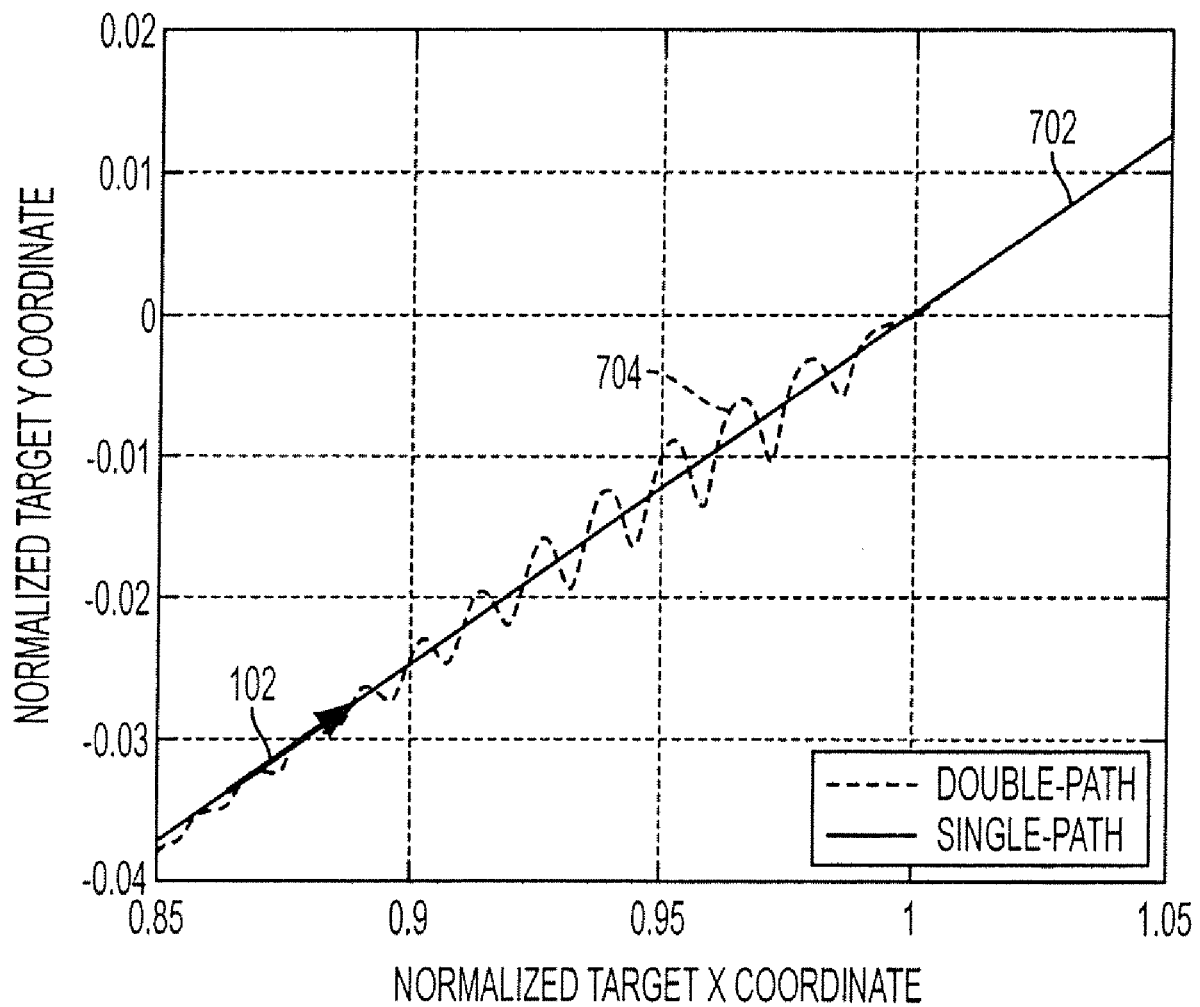
FIG. 10 is a graph showing the effects of implementing a technique for mitigating impacts of multipath signals.

FIG. 10 is a graph depicting the effects of implementing a solution to multipath signals. Line 702 represents the predicted trajectory for a single-path signal of a target 102 while line 704 represents the predicted trajectory for a multi-path signal including target 102 and reflector 104 after mitigating the multi-path impact. Comparing line 204 in FIG. 2 with line 704 in FIG. 10, the approach used in the present invention for mitigating multipath, substantially reduces or eliminates trajectory bias and reduces the magnitude of azimuth wandering.

Figure 11:
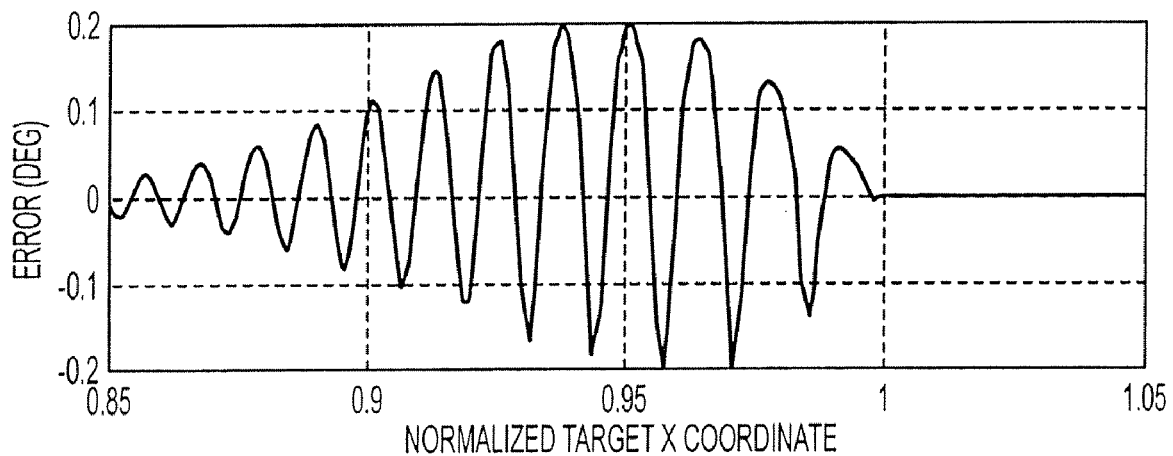
FIG. 11 is a graph of target azimuth error after mitigating multipath impacts as a function of the target normalized X coordinate.
Figure 12:
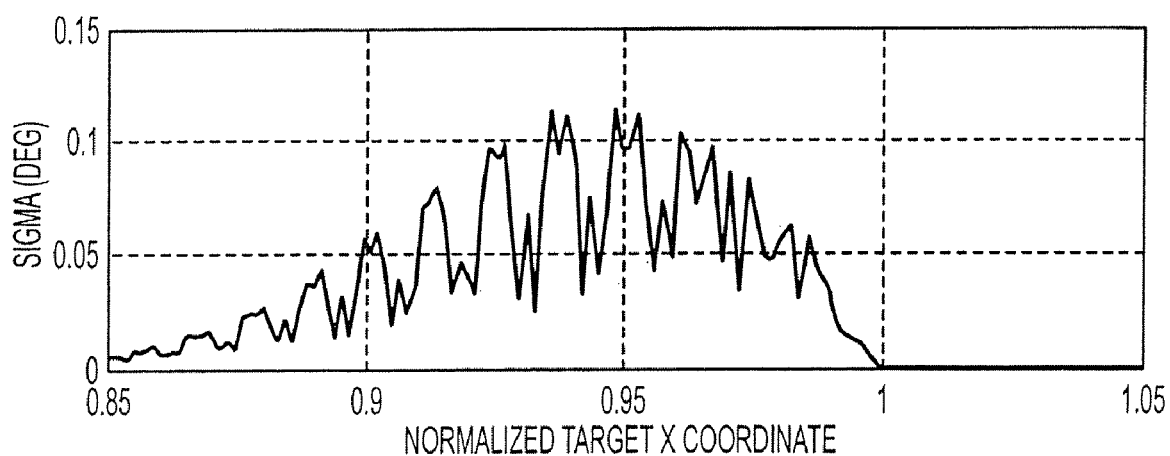
FIG. 12 is a graph of standard deviation of target azimuth after mitigating multipath impacts as a function of the target normalized X coordinate.

FIG. 11 is a graph depicting the error of target azimuth after mitigating multipath impacts as a function of the target normalized X coordinate. FIG. 12 is a graph depicting the standard deviation of target azimuth after mitigating multipath impacts as a function of the target normalized X coordinate. Both FIGS. 11 and 12 relate to the target azimuth after mitigating multipath impacts, as shown in FIG. 10.

The mitigating of the multipath impacts in FIG. 10 can be attributed to reducing azimuth error from a maximum value of 1.4° to a maximum value of 0.2° and reducing the azimuth standard deviation σ from a maximum value of 10° to a maximum value of 0.1°. This can be seen by comparing FIG. 7 to FIG. 11 and FIG. 8 to FIG. 12.

The errors and the standard deviation σ are not totally eliminated because of the behavior of the monopulse ratio when the target and its image are not resolved. In that case, the antenna boresight angle of the minimum of the magnitude for the monopulse ratio does not coincide with the exact target azimuth and it varies as the target azimuth varies.

Figure 14:
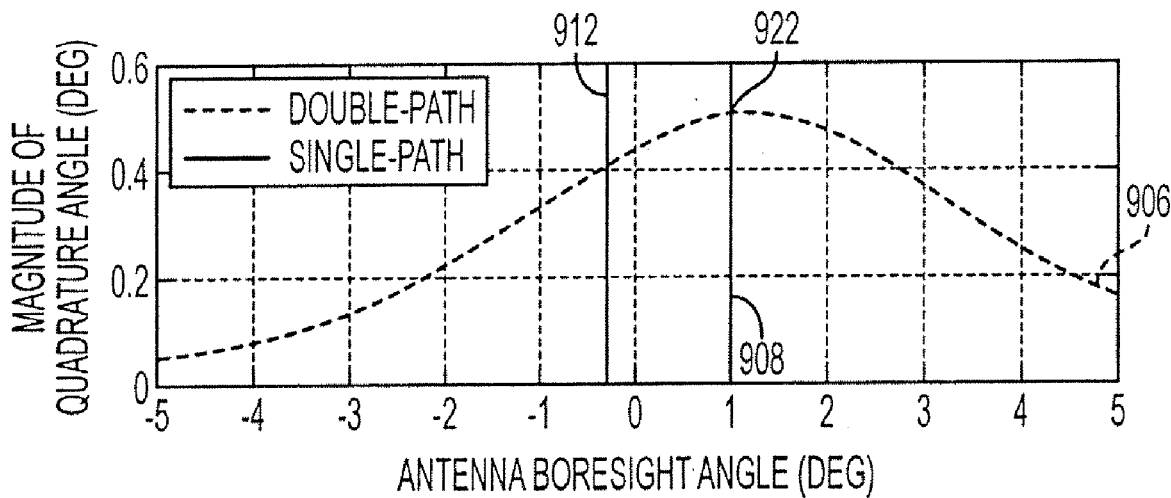
FIG. 14 is a graph depicting the magnitude of quadrature angle for monopulse ratio as a function of antenna boresight angle.
Figure 15:
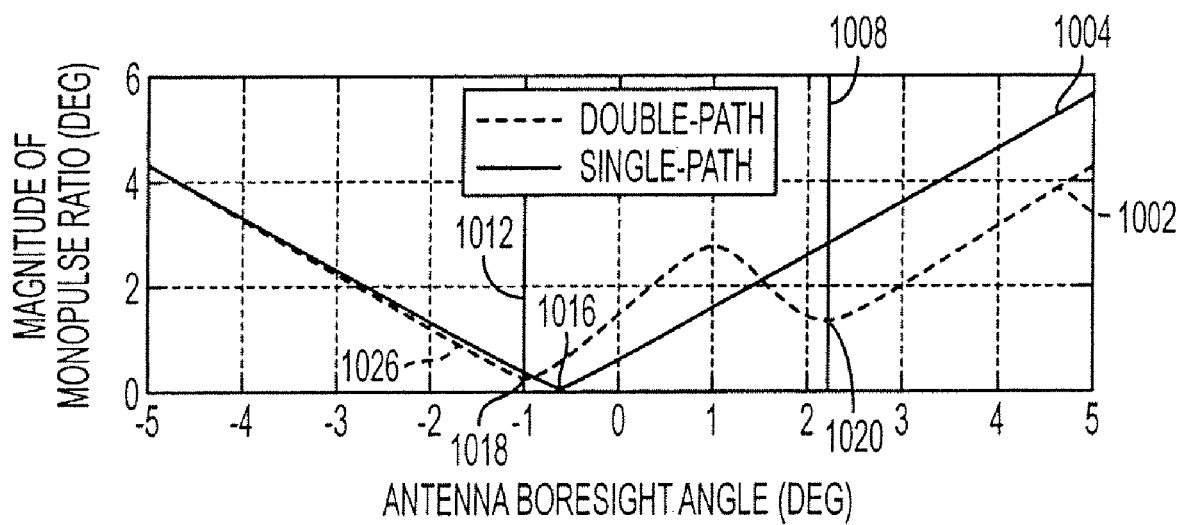
FIG. 15 is a graph of the magnitude of the monopulse ratio as a function of antenna boresight angle.

FIG. 13 is a graph depicting the magnitude of monopulse ratio as a function of antenna boresight angle while FIG. 14 is a graph depicting the magnitude of quadrature angle as a function of antenna boresight angle. In FIG. 13, line 902 represents the magnitude of the monopulse ratio for a double-path signal. Line 904 represents the magnitude of the monopulse ratio for a single-path signal. As can be seen in a single-path signal, the target is located at point 916 at the boresight angle where the magnitude of the monopulse ratio is 0. In the double-path image, point 918 represents a minimum of the magnitudes of the monopulse ratio. When there is only one minimum, point 918 may not be the location of the target. In both FIGS. 13 and 14, line 912 intersects both graphs at the minimum 918 of the double-path signal.

In FIG. 14, line 906 represents the magnitude of the quadrature angles for a double path signal while point 922 represents a maximum of the magnitude of the quadrature angle. In both FIGS. 13 and 14 line 908 intersects both graphs at the maximum of the quadrature angles 922 of the double-path signal. Since there is only one minimum of the magnitude of monopulse ratio and only one maximum of the magnitude of the quadrature angle, the region of the boresight angle in area 924 between line 912 and 908 is excluded when choosing the target azimuth region. The non-excluded region of the boresight angle in area 926 near the minimum 918 of the magnitudes of the samples of monopulse ratio for the double-path signal is chosen as the target azimuth region.

Figure 16:
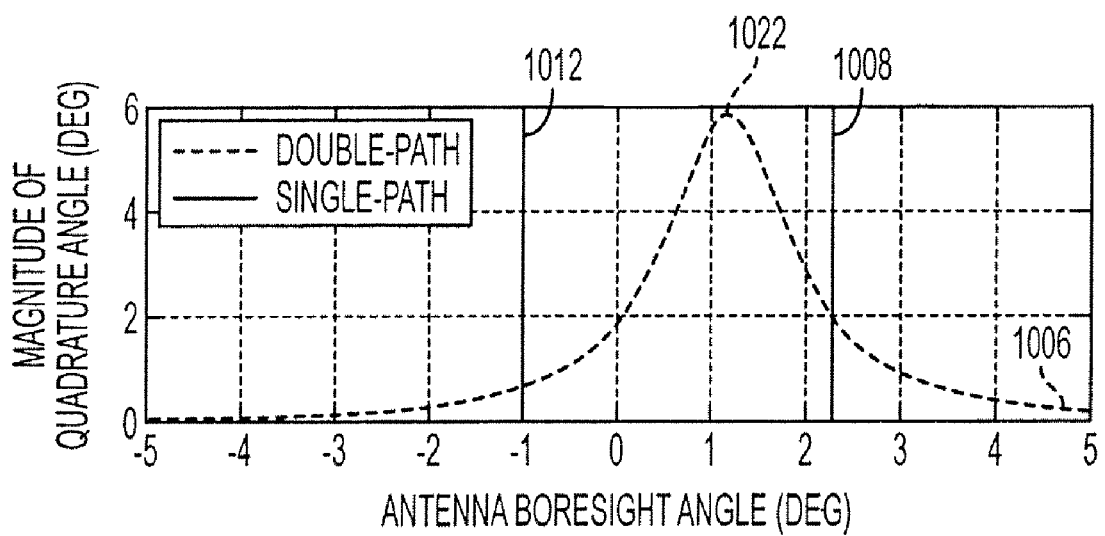
FIG. 16 is a graph of the magnitude of the quadrature angle for the monopulse ratio as a function of antenna boresight angle.

FIG. 15 is a graph depicting the magnitude of the monopulse ratio as a function of antenna boresight angle while FIG. 16 is a graph depicting the magnitude of the quadrature angle as a function of antenna boresight angle. In FIG. 15, line 1002 represents the magnitude of the monopulse ratio for a double-path signal. Line 1004 represents the magnitude of the monopulse ratio for a single-path signal. As can be seen in a single-path signal, the target is located at point 1016 where the magnitude of the monopulse ratio is 0. In the double-path signal, the target is located at point 1018 and the image is located at point 1020. Point 1020 and point 1018 are also minima of the magnitude of the monopulse ratio.

In both FIGS. 15 and 16, line 1012 intersects both graphs at the target location 1018 of the double-path signal. Similarly, in both FIGS. 15 and 16, line 1008 intersects both graphs at the image location 1020 of the double-path signal. In FIG. 16, line 1006 represents the magnitude of the quadrature angles while point 1022 represents a maximum of the magnitude of the quadrature angle. Since there are two minima of the magnitude of the monopulse ratio for the double-path signal and one maximum of the quadrature angle for the double-path signal, the region of the boresight angle in area 1024 between the two minima of the magnitude of the monopulse ratio for the double-path signal is excluded when choosing the target azimuth region. The non-excluded region of the boresight angle is area 1026 near the lowest minimum of the two minima of the magnitudes of the samples of quadrature angles is chosen as the target azimuth region.

In one embodiment, the region to the left of line 1012 can be considered the target azimuth region, the area to the right of line 1008 can be considered the image azimuth region, and the area between line 1008 and line 1012 can be considered the interference azimuth region or target-image azimuth region for both graphs 15 and 16.

Figure 17:
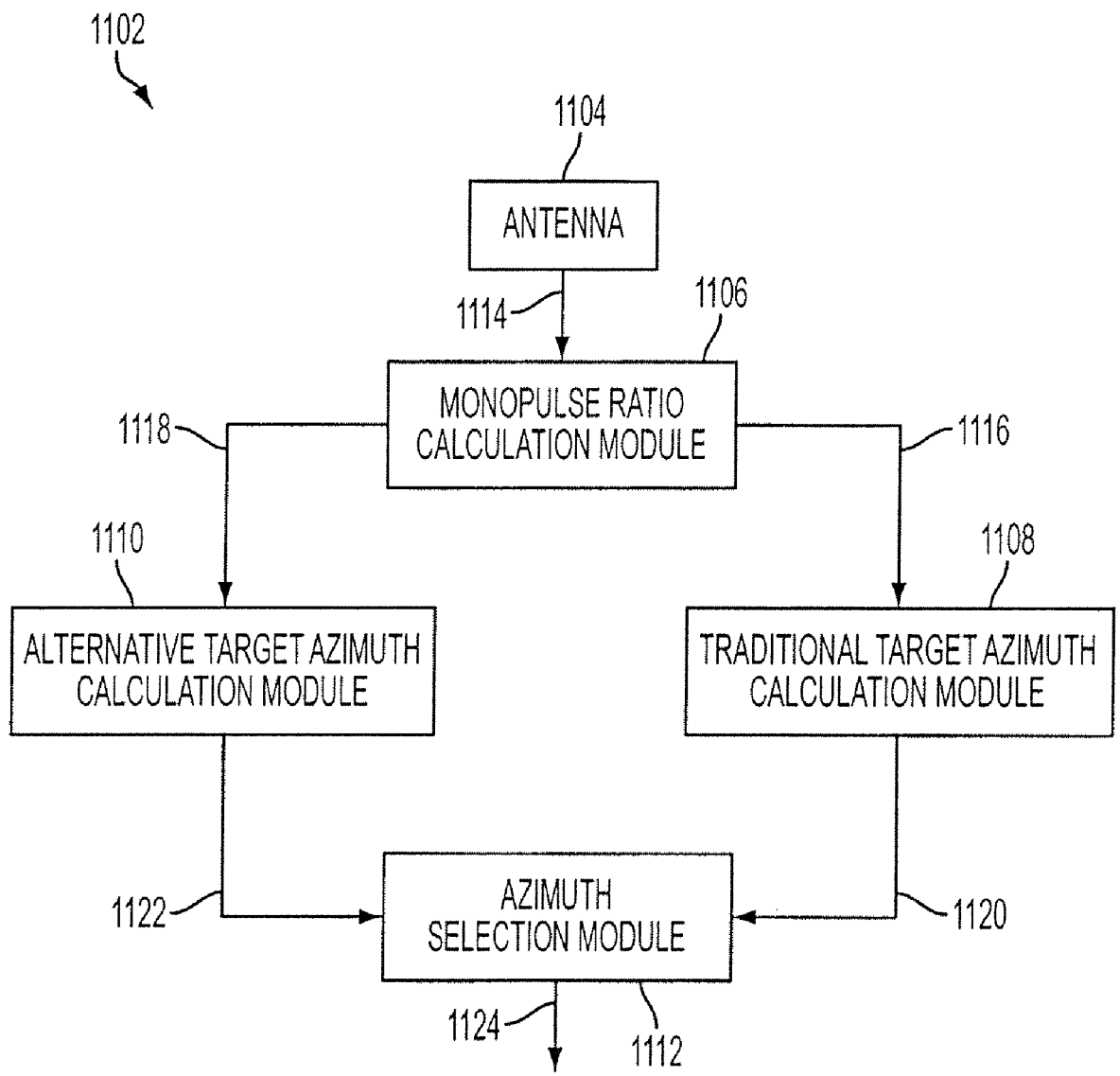
FIG. 17 is a block diagram of a preferred embodiment of the present invention.

FIG. 17 illustrates an embodiment of the present invention 1102. The present invention 1102 comprises two channel antenna 1104, monopulse ratio calculation module 1106, traditional target azimuth calculation module 1108, alternative target azimuth calculation module 1110, and azimuth selection module 1112. The two channel antenna 1104 can interrogate a target and receive replies from the interrogation of the target. The replies can include data about the target. The antenna 1104 outputs the result of the interrogation to the monopulse ratio calculation module 1106 by connection 1114.

The monopulse ratio calculation module 1106 then calculates samples of monopulse ratio for samples of antenna boresight angles using the replies from the interrogation of the target. It also calculates the real part for each of the samples of the monopulse ratio, the magnitude for each of the samples of the monopulse ratio, and the magnitude for each quadrature angle for each of the samples of the monopulse ratio. The monopulse ratio calculation module 1106 is connected to the traditional target azimuth calculation module 1108 by connection 1116 and to the alternative target azimuth calculation module 1110 by connection 1118 for transferring some or all of the calculations.

The traditional target azimuth calculation module 1108 receives the samples of monopulse ratio, the real part of the samples of monopulse ratio, the magnitude of the samples of monopulse ratio, or any combination thereof, from the monopulse ratio calculating module 1106 and calculates a mean of samples of traditional target azimuths using the samples of monopulse ratio. It can also calculate a standard deviation of the samples of traditional target azimuth. The traditional target azimuth calculation module is connected to the azimuth selection module 1112 by connection 1120 to output the mean of the samples of traditional target azimuth and also the standard deviation of the samples of traditional target azimuth.

The alternative target azimuth calculation module 1110 receives the samples of monopulse ratio, the magnitudes of the samples of the monopulse ratio, the quadrature angels, or any combination thereof. It can determine the minima of the magnitude of the samples of monopulse ratio and the maxima of the magnitudes of the quadrature angles of the samples of monopulse ratio. Furthermore, it can determine the target azimuth region and calculate an alternative target azimuth from the monopulse ratio within the target azimuth region. The alternative target azimuth calculation module 1110 can be connected to azimuth selection module 1112 by connection 1122 to output the alternative target azimuth.

The azimuth selection module 1112 receives the mean of the samples of traditional target azimuth and the standard deviation of the samples of traditional target azimuth from the traditional target azimuth calculation module 1108 by connection 1120 and the alternative target azimuth from the alternative target azimuth calculation module 1110 by connection 1122. The azimuth selection module 1112 compares the standard deviation of the samples of traditional target azimuth with a threshold value. If the standard deviation of the samples of first target azimuths is greater than the threshold value, then the azimuth selection module 1112 outputs the alternative target azimuth by connection 1124. If the standard deviation of the samples of traditional target azimuth is not greater than the threshold value, then the azimuth selection module 1112 outputs the mean of the samples of traditional target azimuth by connection 1124.

The alternative target azimuth calculation module 1110 performs its calculations substantially in parallel with the first target azimuth calculation module 1108. However, the alternative target azimuth calculation module 1110 could also perform its calculations in serial, or partially in serial with traditional target azimuth calculation module 1108. The alternative target azimuth calculation module 1110 could also wait to perform its calculations until the azimuth selection module has determined that the standard deviation of samples of traditional target azimuth is greater than the threshold value.

Those skilled in the art will appreciate that various adaptations and modifications of the just described preferred embodiments can be configured without departing from the scope and spirit of the invention. Therefore, it is to be understood that, within the scope of the appended claims, the invention may be practiced other than as specifically described herein.

What is claimed is:

1. A method for mitigating multipath impacts on azimuth accuracy in a monopulse interrogator the steps of the method comprising:

calculating samples of monopulse ratio for samples of antenna boresight angle using interrogation replies from a target;

calculating samples of traditional target azimuth from the samples of monopulse ratio;

calculating a mean of the samples of traditional target azimuth;

calculating a standard deviation of the samples of traditional target azimuth from the samples of monopulse ratio; and comparing the standard deviation to a predetermined threshold to determine if a multipath signal exists.

2. The method of claim 1 further comprising:

calculating a magnitude for each of the samples of the monopulse ratio;

calculating a quadrature angle for each of the samples of the monopulse ratio;

calculating a magnitude for the quadrature angle for each of the samples of the monopulse ratio;

calculating a real part for each of the samples of the monopulse ratio; and calculating an alternative target azimuth from the samples of target monopulse ratio.

3. The method of claim 2 further comprising outputting the mean of the samples of traditional target azimuth if the multipath signal does not exist and outputting the alternative target azimuth if the multipath signal does exist, wherein the multipath signal does exist if the standard deviation is above a predetermined value and the multipath signal does not exist if the standard deviation is not above a predetermined value.

4. The method of claim 3 further comprising:

searching for antenna boresight angles at which one or more minima of the magnitudes of the samples of monopulse ratio occur; and searching for antenna boresight angles at which one or more maxima of the magnitudes of the samples of quadrature angle occur.

5. The method of claim 4 further comprising:

determining a target azimuth region using the one or more minima of the magnitudes of the samples of monopulse ratio and the one or more maxima of the magnitudes of the samples of quadrature angle.

6. The method of claim 5 wherein the alternative target azimuth is calculated from the samples of monopulse ratio within the target azimuth region.

7. The method of claim 6 wherein determining the target azimuth region if there are only two minima of the magnitude of the samples of monopulse ratio and only one maximum of the magnitude of the samples of quadrature angles includes excluding a region of antenna boresight angles between the two minima of the magnitude of the samples of monopulse ratio and choosing a non-excluded region of antenna boresight angles near the lowest minimum of the two minima of the magnitude of the samples of quadrature angles as the target azimuth region.

8. The method of claim 6 wherein determining the target azimuth region if there is only one minimum of the magnitude of the samples of monopulse ratio and only one maximum of the magnitudes of the samples of quadrature angles includes excluding a region of antenna boresight angle between the minimum of the magnitude of the samples of monopulse ratio and the maximum of the magnitudes of the samples of quadrature angle and choosing a non-excluded region of antenna boresight angle near the minimum of the magnitude of the samples of monopulse ratio as the target azimuth region.

9. A method for mitigating multipath impacts on azimuth accuracy in a monopulse interrogator, the steps of the method comprising:

calculating samples of monopulse ratio for samples of antenna boresight angle using interrogation replies from a target;

calculating a magnitude for each of the samples of the monopulse ratio;

calculating a quadrature angle for each of the samples of the monopulse ratio;

calculating a magnitude for each quadrature angle for each of the samples of the monopulse ratio;

calculating a real part for each of the samples of the monopulse ratio;

calculating samples of traditional target azimuth from the samples of monopulse ratio;

calculating a mean of the samples of traditional target azimuth;

calculating a standard deviation of the samples of traditional target azimuth;

comparing the standard deviation to a predetermined threshold to determine if a multipath signal exists, the multipath signal does exist if the standard deviation is above a predetermined value and the multipath signal does not exist if the standard deviation is not above a predetermined value; and outputting the mean of the samples of traditional target azimuth if the multipath signal does not exist.

10. The method of claim 9 further comprising:

calculating an alternative target azimuth from the samples of monopulse ratio;

searching for antenna boresight angles at which one or more minima of the magnitude of the samples of monopulse ratio occur; and searching for antenna boresight angles at which one or more maxima of the magnitudes of the samples of quadrature angle occur.

11. The method of claim 10 further comprising:

determining a target azimuth region using the one or more minima of the magnitudes of the samples of monopulse ratio and the one or more maxima of the magnitudes of the samples of quadrature angle.

12. The method of claim 11 wherein the alternative target azimuth is calculated from the samples of monopulse ratio within the target azimuth region.

13. The method of claim 12 wherein determining the target azimuth region if there are only two minima of the magnitudes of the samples of monopulse ratio and only one maximum of the magnitude of the samples of quadrature angles includes excluding a region of antenna boresight angles between the two minima of the magnitudes of the samples of monopulse ratio and choosing a non-excluded region of antenna boresight angles near the lowest minimum of the two minima of the magnitudes of the samples of quadrature angle as the target azimuth region.

14. The method of claim 13 wherein determining the target azimuth region if there is only one minimum of the magnitudes of the samples of monopulse ratio and only one maximum of the magnitudes of the samples of quadrature angles includes excluding a region of antenna boresight angles between the minimum of the magnitudes of the samples of monopulse ratio and the maximum of the magnitudes of the samples of quadrature angle and choosing a non-excluded region of antenna boresight angles near the minimum of the magnitudes of the samples of monopulse ratio as the target azimuth region.

15. A method for mitigating multipath impacts on azimuth accuracy in a monopulse interrogator the steps of the method comprising:
  calculating samples of monopulse ratio for samples of antenna boresight angles from an interrogation of a target;
  calculating a magnitude for each of the samples of the monopulse ratio;
  calculating a quadrature angle for each of the samples of the monopulse ratio;
  calculating a real part for each of the samples of the monopulse ratio;
  calculating samples of traditional target azimuth from the samples of monopulse ratio;
  calculating a mean of the samples of traditional target azimuth;
  searching for antenna boresight angles at which one or more minima of the magnitudes of the samples of monopulse ratio occur;
  searching for antenna boresight angles at which one or more maxima of the magnitudes of the samples of quadrature angles occur;
  determining a target azimuth region using the one or more minima of the magnitudes of the samples of monopulse ratio and the one or more maxima of the magnitudes of the samples of quadrature angle;
  calculating an alternative target azimuth from the samples of monopulse ratio within the target azimuth region;
  comparing a standard deviation to a predetermined threshold to determine if a multipath signal exists, wherein the multipath signal does exist if the standard deviation is above a predetermined threshold value and the multipath signal does not exist if the standard deviation is not above a predetermined threshold value; and
  outputting the mean of the samples of traditional target azimuth if the multipath signal does not exist and outputting the alternative target azimuth if the multipath signal does exist.

16. The method of claim 15 wherein determining the target azimuth region if there are only two minima of the magnitude of the samples of monopulse ratio and only one maximum of the magnitude of the samples of quadrature angles includes excluding a region of antenna boresight angles between the two minima of the magnitude of the samples of monopulse ratio and choosing a non-excluded region of antenna boresight angles near the lowest minimum of the two minima of the magnitude of the samples of quadrature angle as the target azimuth region.

17. The method of claim 15 wherein determining the target azimuth region if there is only one minimum of the magnitudes of the samples of monopulse ratio and only one maximum of the magnitudes of the samples of quadrature angles includes excluding a region of antenna boresight angles between the minimum of the magnitudes of the samples of monopulse ratio and the maximum of the magnitudes of the samples of quadrature angle and choosing a non-excluded region of antenna boresight angles near the minimum of the magnitudes of the samples of monopulse ratio as the target azimuth region.

18. A monopulse interrogator comprising:
  an antenna for interrogating a target and receiving data from the target;
  a monopulse ratio calculation module connected to the antenna for receiving the target data and calculating samples of monopulse ratio for samples of antenna boresight angles using the samples of data;
  a traditional target azimuth calculation module connected to the monopulse ratio calculation module for receiving the samples of monopulse ratio and calculating a mean of traditional target azimuths using the samples of monopulse ratio;
  an alternative target azimuth calculation module connected to the monopulse ratio calculation module for receiving the samples of monopulse ratio and calculating a second target azimuth using the samples of monopulse ratio; and
  an azimuth selection module connected to the traditional target azimuth calculation module for receiving the mean of the traditional target azimuth and connected to the alternative target azimuth calculation means for receiving the alternative target azimuth, the azimuth selection module selecting the mean of the traditional target azimuths if multipath signals do not exist, or the alternative target azimuth if multipath signals exist.

19. The monopulse interrogator of claim 18 wherein the monopulse calculation module further calculates a magnitude for each of the samples of the monopulse ratio a quadrature angle for each of the samples of the monopulse ratio, a magnitude for each quadrature angle for each of the samples of the monopulse ratio, and a real part for each of the samples of the monopulse ratio.

20. The monopulse interrogator of claim 19 wherein the traditional target azimuth calculation module calculates a standard deviation of the samples of traditional target azimuth.

21. The monopulse interrogator of claim 20 wherein the azimuth selection module receives the standard deviation from the traditional azimuth calculation module and determines if the standard deviation is above a predetermined threshold value, and wherein if the standard deviation is above a predetermined threshold value, then multipath signals exist and if the standard deviation is not above a predetermined threshold value, then multipath signals do not exist.

22. The monopulse interrogator of claim 21 wherein the alternative target azimuth calculation module receives the magnitude for each of the samples of the monopulse ratio and the magnitude for each quadrature angle for each of the samples of the monopulse ratio from the monopulse ratio calculation module, and
  wherein the alternative target azimuth calculation module searches for antenna boresight angles at which one or more minima of the magnitudes of the samples of monopulse ratio occur, and searches for antenna boresight angles at which one or more maxima of the magnitude of the samples of quadrature angles occur.

23. The monopulse interrogator of claim 22 wherein the alternative target azimuth calculation module determines a target azimuth region using the one or more minima of the magnitude of the samples of monopulse ratio and the one or more maxima of the magnitude of the samples of quadrature angles.

24. The monopulse interrogator of claim 23 wherein the alternative target azimuth calculation module receives the monopulse ratio from the monopulse ratio calculation means and calculates the alternative target azimuth using the monopulse ratio in the target azimuth region.

25. The monopulse interrogator of claim 24 wherein if there are only two minima of the magnitudes of the samples of monopulse ratio and only one maximum of the magnitude of the samples of quadrature angle, the alternative target azimuth calculation module excludes a region of antenna boresight angles between the two minima of the magnitudes of the samples of monopulse ratio and chooses a non-excluded region of antenna boresight angle near the lowest minimum of the two minima of the magnitudes of the plurality of quadrature angles as the target azimuth region, and wherein if there is only one minimum of the magnitude of the samples of monopulse ratio and only one maximum of the magnitude of the samples of quadrature angle, the alternative target azimuth calculation module excludes a region of antenna boresight angles between the minimum of the magnitudes of the samples of monopulse ratio and the maximum of the magnitudes of the samples of quadrature angle and chooses a non-excluded region of antenna boresight angles near the minimum of the magnitudes of the samples of monopulse ratio as the target azimuth region.

* * * * *